United States Patent
Lawver et al.

(10) Patent No.: US 12,487,098 B2
(45) Date of Patent: Dec. 2, 2025

(54) OPTICAL MAP DATA AGGREGATION AND FEEDBACK IN A CONSTRUCTION ENVIRONMENT

(71) Applicant: Trimble Inc., Westminster, CO (US)

(72) Inventors: Jordan Lawver, Denver, CO (US); Murari Krishnan, Superior, CO (US); David Burczyk, Arvada, CO (US); Bryan Williams, Westminster, CO (US); Peter Ziegler, San Francisco, CA (US); Kent Kahle, Fallbrook, CA (US)

(73) Assignee: Trimble Inc., Westminster, CO (US)

( * ) Notice: Subject to any disclaimer, the term of this patent is extended or adjusted under 35 U.S.C. 154(b) by 277 days.

(21) Appl. No.: 17/981,375

(22) Filed: Nov. 4, 2022

(65) Prior Publication Data

US 2024/0151551 A1 May 9, 2024

(51) Int. Cl.
*G01C 21/00* (2006.01)
*G05D 1/00* (2024.01)

(52) U.S. Cl.
CPC ...... *G01C 21/3841* (2020.08); *G01C 21/3811* (2020.08); *G01C 21/3896* (2020.08); *G05D 1/0212* (2013.01); *G05D 1/0278* (2013.01)

(58) Field of Classification Search
CPC ............ G01C 21/3841; G01C 21/3811; G01C 21/3896; G01C 21/3833; G01C 21/005; G01C 21/206; G01C 15/002; G01C 21/1656; G01C 21/3848; G01C 21/165; G01C 21/383; G01C 21/1652; G01C 21/32; G01C 21/3804; G01C 11/02; G01C 21/20; G01C 21/3885; G01C 15/00; G01C 11/00; G01C 15/004; G01C 15/02; G01C 15/04; G01C 21/30; G01C 21/00; G05D 1/0212; G05D 1/0278; G05D 1/0274; G05D 1/0246; G05D 1/024; G05D 1/0242; G05D 1/246; G05D 1/2464; G05D 1/0038;

(Continued)

(56) References Cited

U.S. PATENT DOCUMENTS 11,360,310 B2  6/2022  Lawver et al.
11,373,381 B1 *  6/2022  Kahle ..................... G06T 17/00
(Continued)

FOREIGN PATENT DOCUMENTS

KR    101217857 B1 *  1/2013 ............. B62D 63/00
WO    2019/090417 A1    5/2019

OTHER PUBLICATIONS

Two Stage View Planning for Large-Scale Site Modeling Paul S. Blaer Peter K. Allen Department of Computer Science, Columbia University New York, NY 10027 IEEE 2006 (Year: 2006).*

(Continued)

*Primary Examiner* — Rachid Bendidi
*Assistant Examiner* — Irene C Khuu
(74) *Attorney, Agent, or Firm* — Kilpatrick Townsend & Stockton LLP

(57) ABSTRACT

A central map can be used in a construction environment to help position devices and receive updates from devices to update the central map. Devices in the construction environment, such augmented-reality devices, laser scanners, total stations, satellite navigation receivers, and others can be used to provide "crowd-sourced" data to update the central map as the construction environment changes.

18 Claims, 9 Drawing Sheets

(58) Field of Classification Search
CPC ............. G05D 1/0011; G05D 2105/87; G05D 2111/17; G05D 1/0227; G01S 17/89; G01S 17/86; G01S 7/4808; G01S 17/42; G01S 17/894; G01S 7/4817; G01S 19/42; G01S 7/51; G01S 7/003; G01S 13/86; G01S 13/89; G01S 5/0252; G01S 15/89; G01S 7/40; G06T 19/006; G06T 2207/10028; G06T 17/05; G06T 7/521; G06T 7/74; G06T 19/003; G06T 7/73; G06T 19/20; G06T 2207/30204; G06T 7/33; G06T 17/00; G06T 7/70; G06T 2200/04; G06T 2200/08; G06T 2210/04; G06T 7/55; G06T 2219/2004; G06T 7/337; G06T 2207/30244; G06T 7/001; G06T 7/00; G06F 30/13; G06F 2111/18; G06F 2111/10; G06F 3/011; G06V 20/20; G06V 20/56; G06V 20/17; G06V 20/52; G06V 20/58; G06V 10/16; G06V 10/17; G06V 20/13; G06V 20/10; G06V 10/28; G06V 10/26; G06V 10/761; G06V 20/176; G06V 20/70; G02B 27/017; G02B 27/0172; G02B 2027/0138; G02B 26/10; G02B 2027/014; G06Q 10/06; G06Q 50/08; G06Q 10/10; G06Q 50/165; B64U 2101/30; B64U 10/13; B64U 10/14; B64U 2101/20; B64U 2201/102; B64U 80/86; B64U 20/87; B64U 2201/00; B64U 2201/20; A61B 2034/2065; A61B 2090/365
See application file for complete search history.

(56) References Cited

U.S. PATENT DOCUMENTS

| | | | | |
|---|---|---|---|---|
| 2003/0004645 | A1* | 1/2003 | Kochi | G06T 7/593 348/E13.008 |
| 2007/0282565 | A1* | 12/2007 | Bye | G01C 21/20 702/158 |
| 2008/0186255 | A1* | 8/2008 | Cohen | G06F 3/0321 345/179 |
| 2018/0283862 | A1* | 10/2018 | Kahle | G01S 5/163 |
| 2019/0186923 | A1* | 6/2019 | Servos | G05D 1/0246 |
| 2019/0346271 | A1* | 11/2019 | Zhang | G05D 1/245 |
| 2020/0286289 | A1* | 9/2020 | Mitchell | G01C 15/002 |
| 2020/0413011 | A1* | 12/2020 | Zass | G06Q 30/0185 |
| 2021/0078172 | A1* | 3/2021 | Cao | G05D 1/0044 |
| 2021/0192099 | A1* | 6/2021 | Benromano | G06Q 10/06 |
| 2022/0137223 | A1* | 5/2022 | Brenner | G01S 17/87 356/4.01 |
| 2022/0291692 | A1* | 9/2022 | Drinkard | G01C 21/3804 |

OTHER PUBLICATIONS

Extended European Search Report for Application No. 23204790.2-1009, date of completion of the search Mar. 5, 2024, 8 pages.

* cited by examiner

OPTICAL MAP DATA AGGREGATION AND FEEDBACK IN A CONSTRUCTION ENVIRONMENT

The following U.S. patent applications (including this one) are being filed concurrently, and the entire disclosure of the other applications are incorporated by reference into this application for all purposes:
application Ser. No. 17/981,373, filed Nov. 4, 2022, entitled "TOTAL STATION RE-SECTIONING USING TWO-DIMENSIONAL TARGETS";
application Ser. No. 17/981,375, filed Nov. 4, 2022, entitled "OPTICAL MAP DATA AGGREGATION AND FEEDBACK IN A CONSTRUCTION ENVIRONMENT"; and
application Ser. No. 17/981,377, filed Nov. 4, 2022, entitled "CONSTRUCTION LAYOUT USING ROBOTIC MARKING AND AUGMENTED REALITY METADATA OVERLAYS".

BACKGROUND

This disclosure relates in general to creating a map and leveraging it for positioning on a site. More specifically, and without limitation, this disclosure relates to surveying systems, augmented reality, and robotic platforms. Surveying systems determine positions of points relative to each other and/or to the Earth. Surveying can be used in many applications by land surveyors, construction professionals, and civil engineers. Surveying often uses specialized and/or expensive equipment, such as laser levels, surveying rods, total stations, laser scanners, and GNSS (Global Navigation Satellite System) receivers.

In augmented reality, one or more virtual objects (e.g., computer-generated graphics) can be presented to a user in relation to real-world objects. Augmented reality can include a see-through display (e.g., passthrough) with a virtual object shown to a user on the see-through display. An example of an augmented-reality system is the Microsoft HoloLens. Another type of augmented reality is overlaying a virtual object on an image of the real world. For example, a smartphone camera is used to acquire an image of objects in the real world. The smart phone then overlays a graphic on the image of the real world while presenting the image on a screen of the smart phone. Artificial reality is sometimes used to refer to both augmented reality and virtual reality.

BRIEF SUMMARY

This disclosure relates to creating and subsequently using and updating a central map and, without limitation, to using a central map in a construction environment.

In certain embodiments, a system for using an aggregated map at a construction site comprises a first device comprising a first optical sensor; a second device comprising a second optical sensor; and one or more memory devices comprising instructions. The instructions, when executed, cause one or more processors to: transmit a first map to the first device; orient the first device to the construction site based on comparing information from the first optical sensor to the first map; receive optical data acquired by the first optical sensor; revise the first map using the optical data from the first optical sensor to generate a second map; transmit the second map to the second device; and/or orient the second device to the construction site based on comparing information from the second optical sensor to the second map. In some embodiments, the first device is an aug-mented-reality device; information from the first optical sensor is a local map of the augmented-reality device; the second device is a robot; and/or the instructions, when executed, further cause the one or more processors to automatically position the robot at the construction site based on orienting the second device to the construction site.

In certain embodiments, a method for using an aggregated map at a construction site comprises receiving a first map of at least a portion of the construction site; transmitting the first map to a first device, wherein the first device comprises a first optical sensor; orienting the first device to the construction site based on comparing information from the first optical sensor to the first map; receiving optical data acquired by the first optical sensor; revising the first map using the optical data from the first optical sensor to generate a second map; transmitting the second map to a second device, wherein the second device comprises a second optical sensor; and/or orienting the second device to the construction site based on comparing information from the second optical sensor to the second map. In some embodiments, the method further comprises receiving optical data acquired by the second optical sensor; revising the second map using the optical data from the second optical sensor to generate a third map; updating the second map based on data from a total station, a robot, a global navigation satellite system, a 360-degree camera, an electronic distance measuring (EDM) unit, a point cloud from a LiDAR device, a reality-capture device, a laser scanner, a depth-sensing device, and/or a radio-based sensor to generate a third map; and/or receiving the optical data acquired by the second optical sensor occurs within 24 hours from receiving the optical data acquired by the first optical sensor. In some embodiments, the construction site is a restricted environment for receiving global navigation satellite system signals; the first map is based on data from a laser scanner; the first device is an augmented-reality device; information from the first optical sensor is a local map of the augmented-reality device; the first map includes labels of features in the construction site; the second map includes color-coding to distinguish optical data acquired by the first device from data in the first map; the second map includes color-coding to distinguish optical data acquired by the first device from data in the first map.

In certain embodiments, a method for updating an aggregated map of an environment comprises transmitting a first map to a first device, wherein the first device comprises a first optical sensor; orienting the first device to the environment based on comparing information from the first optical sensor to the first map; receiving optical data acquired by the first optical sensor, after transmitting the first map to the first device; revising the first map using the optical data from the first optical sensor to generate a second map; receiving optical data acquired by a second optical sensor of a second device, after generating the second map; and/or revising the second map using the optical data from the second optical sensor to generate a third map. In some embodiment, the method further comprises transmitting the third map to a third device, wherein the third device comprises an optical sensor; transmitting the second map to the second device; and/or orienting the second device to the environment based on comparing information from the second optical sensor to the second map. In some embodiments, the first map is based on data from a laser scanner; the first device is an augmented-reality device; and/or receiving the optical data acquired by the second optical sensor occurs within 72 hours from receiving the optical data acquired by the first optical sensor.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
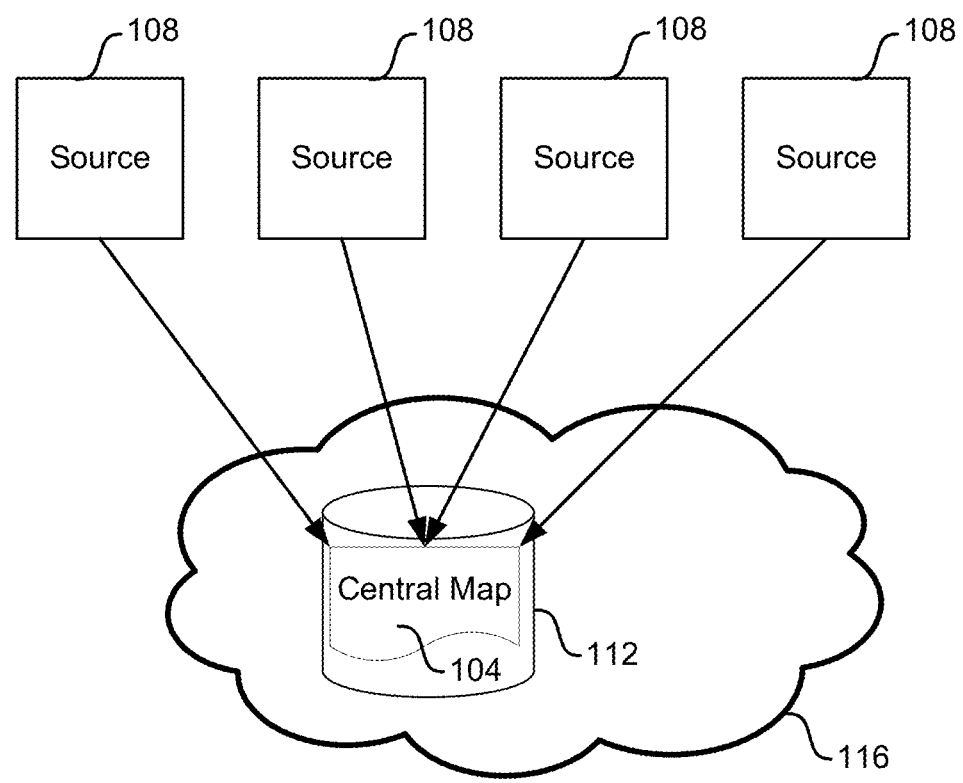
FIG. 1 depicts an embodiment of creating a central map for a construction site.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

This disclosure relates to using an updatable map in an environment, and without limitation, to creating, positioning from, and updating a map for augmented reality (AR) in a construction environment. U.S. patent application Ser. No. 16/924,648, filed on Jul. 9, 2020, and U.S. patent application Ser. No. 17/308,431, filed on May 5, 2021, which are incorporated by reference for all purposes, provide examples of using augmented reality in a construction environment. Construction sites can be difficult environments to position things in (e.g., people, technology, tools, equipment, materials, etc.) due to their congested, ever-changing environment. For example, GNSS may not be available due to overhead obstruction; total stations might not have line of sight, work for only a single user, and/or be prohibitively expensive; outside-in tracking (e.g., mounted cameras) can quickly become covered up, need to be moved often, and/or incur a high cost of infrastructure; inside-out (e.g., computer vision (CV)-based positioning such as SLAM (simultaneous localization and mapping)) can be restricted by a rapidly changing environment, repeating patterns, lack of light or texture; precision required for some applications cannot always rely on a single source of positioning (e.g., uses sensor fusion); radio-based positioning systems may not work well enough in the environment to meet precision needs and/or are not ubiquitous in construction; and/or existing positional technologies on construction sites require training, certain education level, and/or are not accessible to frontline workers.

A vast array of perception/measurement sensors can be used every day on a construction site to passively and/or actively capture an understanding of the current state of the environment (e.g., a 3D map). These sensors include, but are not limited to, LIDAR-based laser scanners; 360 cameras; 3D laser scanners; total stations; EDM (electronic distance measuring) units; tape measures; augmented-reality devices (e.g., with depth perception); robots with cameras/depth sensors (e.g., legged and/or wheeled robotic platforms); GNSS receivers; Internet of Things (IoT) sensors; radio-based sensors; etc.

Data captured by sensors is generally in support of individual workflows, localized to certain locations, applications, and/or time on a jobsite. This data can be crowd-sourced and organized spatially (e.g., stitched into a map) with respect to time. In doing so, a more global re-creation of site conditions can be captured and continually updated and documented over time.

A crowd-sourced map (e.g., a central map) can be processed and stored in a way that enables real-time updates and access. Jobsites can be bandwidth restricted, and thus pre-processing of data can be used to decimate and/or reduce or remove redundant data (e.g., sending only updates to the central map). Depending on workflow requirements, the map may be stored locally or in the cloud. In some embodiments, "fingerprinting" is used where a full 3D map isn't needed for doing positioning, but rather a "fingerprint" that represents the map can be used. For instance, a combination of interest points in a unique pattern can be enough of a fingerprint to align to. In some embodiments, levels of detail are used depending on a specific need or task performed with the data. Regardless, crowd-sourced data is centralized and made accessible to those people/devices that need it and/or have permission to receive it. Captured data can be leveraged, including data that could have been acquired passively (e.g., in the background) or actively, by anyone, by any device, for any reason—for other means regardless of if that was the initial intention in capturing the data.

A device can use the central map to orient (align and/or position) itself to the environment (e.g., automatically). A device can include a current or newly introduced perception sensor (e.g., a sensor that has some means to detect the environment, such as optical, camera, radio waves, etc.). The device can search through the central map to match the device's current view of the environment to orient itself. For example, the device could identify a feature, such as a wall, stair, floor, boards, table, pattern, etc. and match the feature to a feature in the central map to orient the device with respect to the central map and thus with the environment.

A feedback loop can be used to update the central map. Perception sensors that are able to position themselves from the central map (or elsewhere) can also contribute back to the central map. Data captured by sensors can be compared (e.g., constantly or periodically) to the existing central map and updates to the central map can be made as changes occur.

As more data is collected, the more robust (e.g., coverage, accuracy, frequency) the central map can be. Quality and diversity of data can be as important as quantity of data, such as new data that improves the central map rather than just providing redundancy. If the central map is only sparsely updated, it might not accurately reflect the site conditions, and incoming sensors can struggle to orient themselves automatically or with high precision. Color coding (or similar) marking can be used to inform the user of the quality (e.g., newness and/or accuracy) of the data that device is using for positioning and/or work.

The feedback loop between sensors and the central map provides updates to the central map (e.g., by crowd-sourced, source-agnostic capture systems) and positioning of existing/new sensors using the central map, which contribute back to it. Crowd-sourced aggregation of data across different data sources can form an enhanced, time-scaled 3D map of a dynamic construction site. The central map can be a "living, breathing" single source of truth, a "reality capture digital twin." SLAM positioning can be generated from an aggregation of disparate and broader data sources stitched together rather than a single set of sensors.

In some embodiments, the central map positioning system outlined above is not intended to replace existing positioning systems (e.g., GNSS, laser-based, radio-based, etc.) on a construction site, but rather to complement and/or enhance them. Multiple sources of positioning can be leveraged together to add redundancy to accuracy/precision (e.g., similar in ways to how GNSS precision improves as the number of tracked satellites improves). With regard to the "feedback loop," the better the positioning provided to the perception device, the better data it will be able to capture to send updates back to the central map. Multiple sources can provide multiple sources of information to supplement each other. In some embodiments, planar geometry can be leveraged to estimate position between two "disparate" maps (e.g., map data from two different sources or a gap in a capture from a single source that can be interpolated) disconnected by a sparse area, even though no map data there is available.

In some embodiments, the central map can enable specific workflows, such as design vs. as-built, statusing, progress reporting, quality assurance/quality control, coordination; artificial intelligence (AI)/machine learning (ML) segmentation, Internet of Things (IoT), local equipment manager (LEM) (e.g., "where's Steve?" "where's my drill?" "how many people are on site?"); optimized path planning, task setups, site orchestration (e.g., recognize safety hazards, site security, tracking people/equipment/materials); documentation system-of-record; and/or telepresence (e.g., virtually commuting to site).

In some embodiments, the central map can enable map-based positioning and navigation, such as coordination and orchestration of disparate devices/sensors, optimization and/or auto-positioning/navigation of people, performance/algorithm modifications, and/or safety alerts/avoidance zones. Coordination and orchestration of disparate devices/sensors can include location of AR headsets, phones, total stations, scanners, semi/autonomous tools, robots, equipment/asset tags, etc. Relative positioning between sensors that are working in tandem can be monitored (e.g., a person to a tool, a scanner to a HoloLens, and/or robots working together). Optimization and/or auto-positioning/navigation of people can include task guidance, navigation (e.g., "find Steve"), avoidance zones, and/or safety/evacuation (e.g., synchronization or orchestration among robots). Performance/algorithm modifications can include things such as guidance on where to place Wi-Fi beacons based on where people are working, obstructions, etc.; optimizing what Wi-Fi/edge compute node to connect each individual asset to depending on position; and/or optimizing where to drop tools, equipment, total station setups, etc. Safety alerts/avoidance zones can include geofencing and real-time feedback.

The feedback loop between sensors and the central map provides updates to the central map (e.g., by crowd-sourced, source-agnostic capture systems) and positioning of existing/new sensors using the central map, some of which contribute back to it. Crowd-sourced aggregation of data across different data sources can form an enhanced, time-scaled 3D map of a dynamic construction site. The central map can be a "living, breathing" single source of truth, a "reality capture digital twin." SLAM positioning can be generated from an aggregation of disparate and broader data sources stitched together rather than a single set of sensors.

Referring first to FIG. 1, an embodiment of creating a central map 104 for an environment (e.g., a construction site) is shown. One or more sources 108 at the construction site acquire data about the construction site. Sources 108 can be external positioning sources. For example, cameras, AR devices, laser scanners, EDMs, robots, and/or GNSS receivers are used to acquire data about the construction site. In some embodiments, only one source 108 is used (e.g., a laser scanner or a total station). In some embodiments, each source 108 comprises an optical sensor. In the embodiments shown, the central map 104 is stored in a database 112 in the cloud 116.

Figure 2:
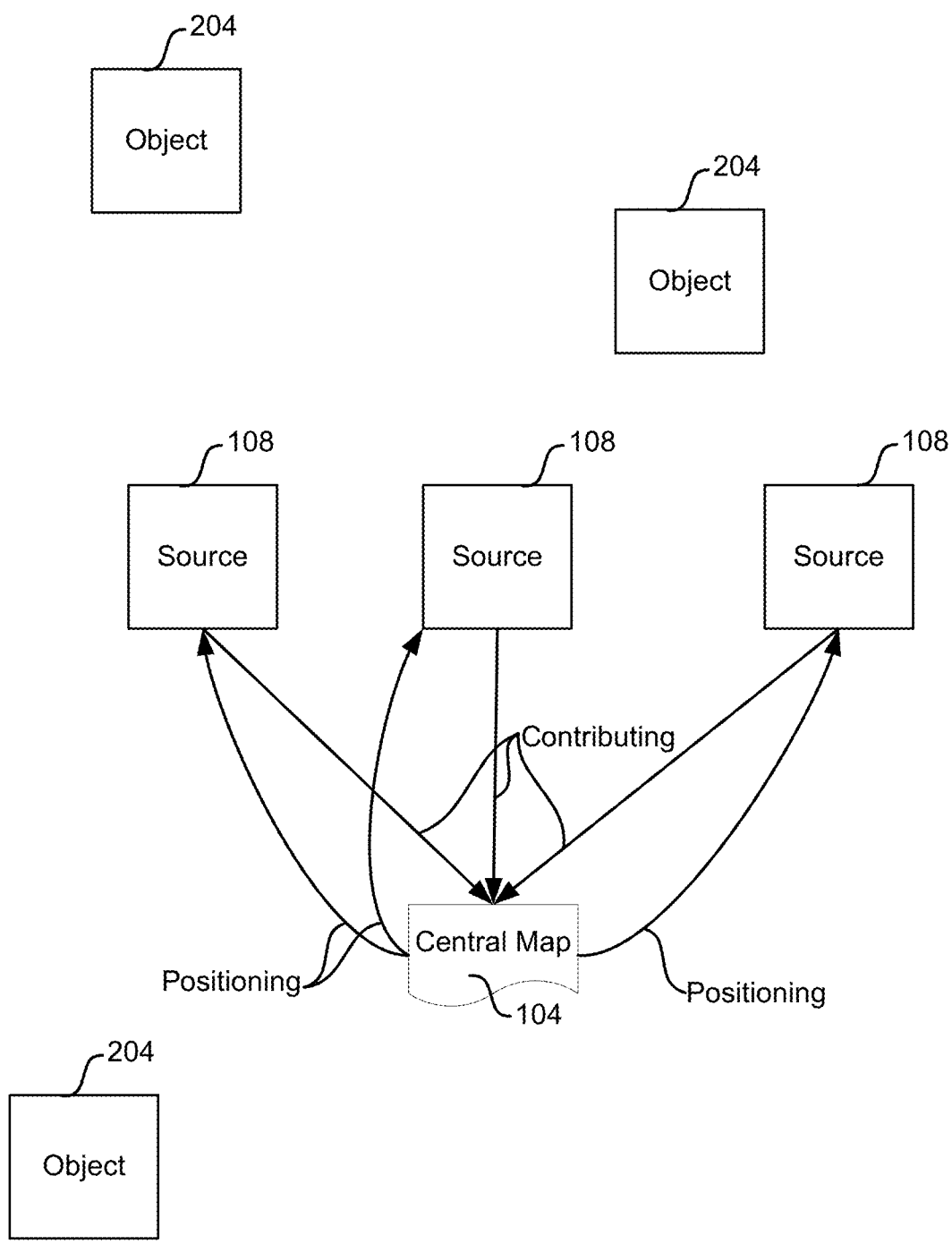
FIG. 2 depicts an embodiment of sensors providing feedback to the central map.

FIG. 2 depicts an embodiment of sources 108 providing feedback to the central map 104. As the construction site changes, such as new objects 204 being added or removed, the sources 108 provide data to the central map 104 about the changes. The central map 104 also provides information (e.g., positioning data and/or information about the environment to the sources 108). The sources 108 providing feedback to the central map 104, and the sources 108 receiving data about the central map 104, is referred to as a feedback loop.

In some embodiments, sources 108 provide new information such as optical data of new areas of the construction site. In some embodiments, optical data is data from, or based on, data acquired by an optical sensor. Thus, data (e.g., reality capture data, images, laser data, etc.) of the construction site can be increased by using a daisy chain of data from various sources 108. In some embodiments, data from sources 108 is updated data (e.g., higher precision or showing a change) from the central map 104.

Figure 3:
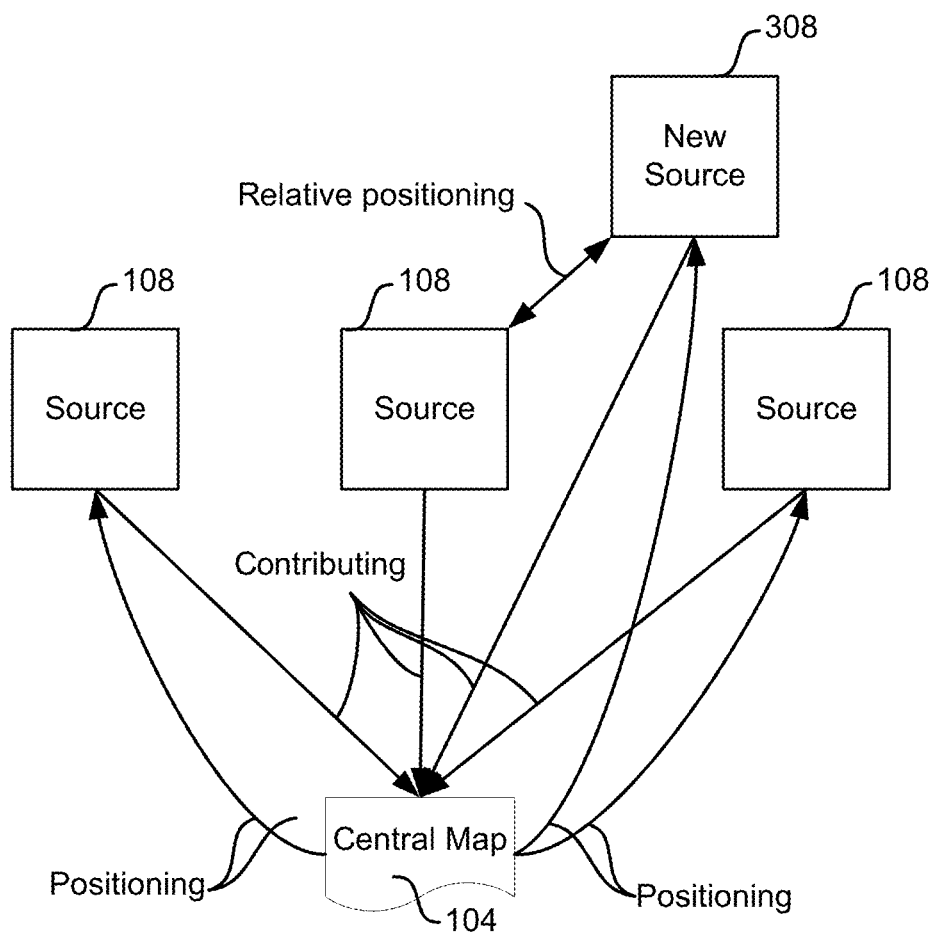
FIG. 3 depicts an embodiment of introducing a new sensor to the construction environment.

FIG. 3 depicts an embodiment of introducing a new source 308 to the construction environment. The new source 308 can receive map data regarding the central map 104, contribute to the central map 104, and/or provide and receive relative position data from sources 108. The new source 308 can position itself in the construction environment based on the map data received from the central map 104 and/or relative position data from sources 108.

Figure 4:
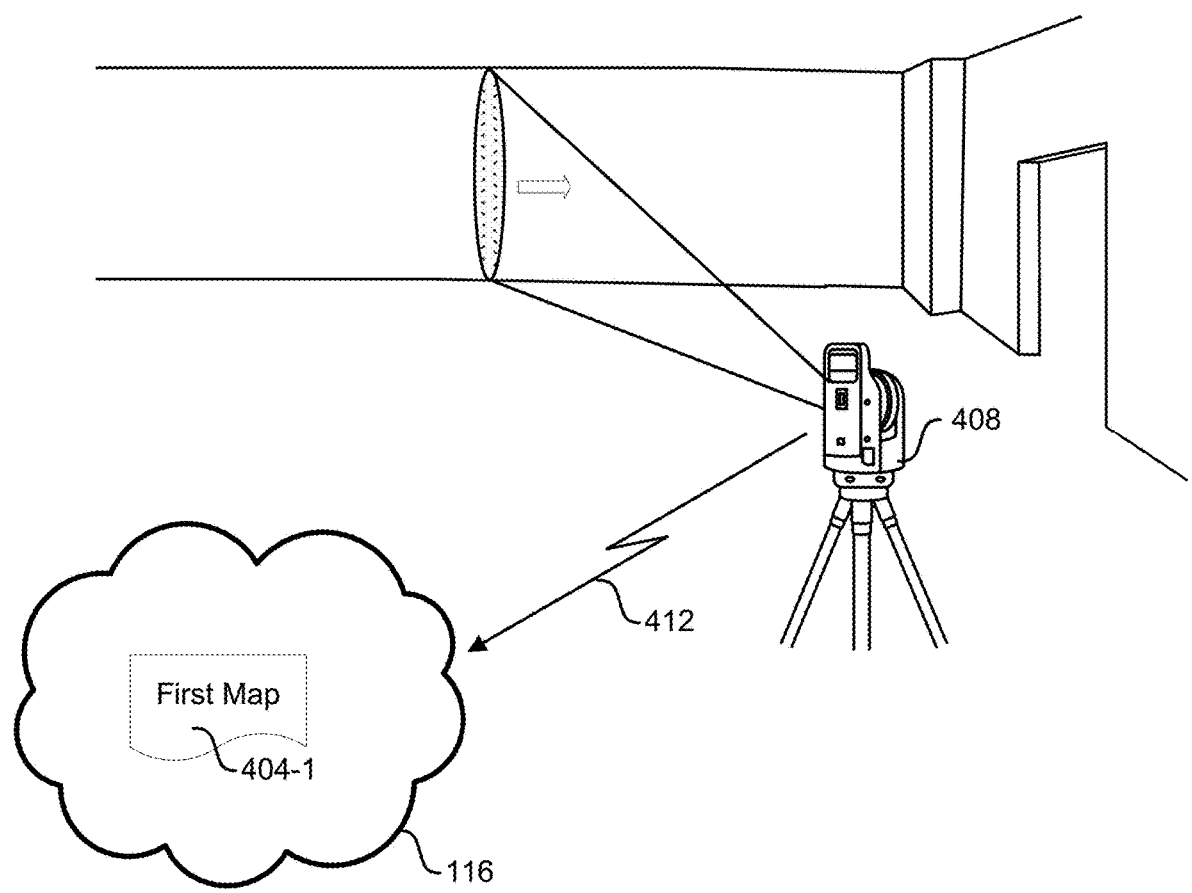
FIG. 4 depicts an embodiment of using a laser scanner for generating a central map.

FIG. 4 depicts an embodiment of generating a first map 404-1 of a central map (e.g., of central map 104 in FIG. 1) using a laser scanner 408. Though FIG. 4 depicts using the laser scanner 408 to generate the first map 404-1, the first map 404-1 could be generated by a device other than the laser scanner 408 (e.g., by an AR device).

Augmented reality has many advantages for a construction site, but augmented reality is not being adopted as quickly as it could be. One reason augmented reality is not being adopted quickly could be based on a problem of orienting an augmented-reality (AR) device (e.g., a phone, tablet, or headset) to the construction site. Orienting the AR device to the construction site can be equipment and/or time intensive (e.g., in some situations, it can require tacit knowledge on control and how to align coordinate systems, which many workers may not have). Thus, there can be a need for easier (e.g., one-click) AR orientation to an environment.

To orient (e.g., automatically) an AR device to an environment, a map of the environment (e.g., a central map) can be provided to the AR device. However, at a construction site, the scenery can change quickly (e.g., putting up sheetrock over 2×4 studs). As the construction site changes, it can be more challenging for the AR device to identify references in the map and the environment (e.g., correlating key features) for positioning itself with the environment using the map. In some embodiments, "crowd-sourced" or "aggregated data" can be used to update the map for positioning. For example, multiple devices provide feedback to the map as the construction site changes. Thus, the central map can enable collaboration between many sensors and sensor types. However, before the map can be used for positioning, the map needs sufficient data. Users often desire the map to be useful before using the map and/or contributing to the map. In some embodiments, the map is first generated using a non-AR device (e.g., a device with higher precision and/or less drift) so that the generated map can be used by other devices, such as AR devices. In some embodiments, an AR device is used to generate an initial map.

Map data from multiple optical sources is aggregated to provide a central map of a construction site so that devices (e.g., AR devices) can orient themselves to the environment. For example, a "one-click" setup could be used to orient an AR headset to an environment using features from the central map.

In some embodiments, using a central map can be broken down into three stages: (1) build the central map, (2) position/orient a device using data from the central map, and (3) provide feedback to the central map. Having a shared, central map can provide common virtual references to multiple users. The central map can also be used for other tasks (e.g., where is the wrench; where is Bob?). The central map can be further enhanced by fusing it with data from other positioning systems (e.g., GNSS, laser scanner, total station). Also, areas of the map can be daisy-chained together using multiple sources with at least some overlap of data. Mapping discussed herein can be different from other mapping because the mapping is performed visually and with precision. In some embodiments, the central map can also include fingerprinting of objects, such as position (e.g., x, y, z), color (r, b, g), etc.

FIG. 4 depicts stage 1 of using the central map: building the central map. In FIG. 4, data from the laser scanner 408 is used to build the first map 404-1. The laser scanner 408 generates a point cloud that is used as a foundation for the initial map of the environment. The point cloud provides precise positions of objects in the environment. The first map 404-1, based on the point cloud from the laser scanner 408 (e.g., or based on fingerprints or images), does not need to map every feature in the environment. If there is enough data for another device/sensor (e.g., an AR device/camera) to orient itself to the environment based on the first map 404-1, the first map 404-1 can be used. In some embodiments, the first map is the point cloud from the laser scanner 408. In some embodiments, the point cloud is processed (e.g., point data converted to polygonal shapes representing walls, floors, ceilings, chairs, tables, studs, etc.) to generated processed data. In some embodiments, processed data is used to conserve bandwidth transmission of data (e.g., polygon data can be smaller in size than point-cloud data).

Data from the laser scanner 408 to the cloud 116 can be transmitted by comm link 412. The comm link 412 can be passed through and/or be transmitted by multiple communication devices. For example, data from the laser scanner 408 could go to a Wi-Fi router to a laptop computer, and from the laptop computer to a remote server; or from the laser scanner 408 to a mobile device, and from the mobile device to a server (e.g., via Bluetooth, Wi-Fi, and/or cellular).

In some embodiments the laser scanner is on a robot. The laser scanner can refresh the central map periodically or on instruction. For example, the laser scanner could be on a robot that scans the construction site each night.

Figure 5:
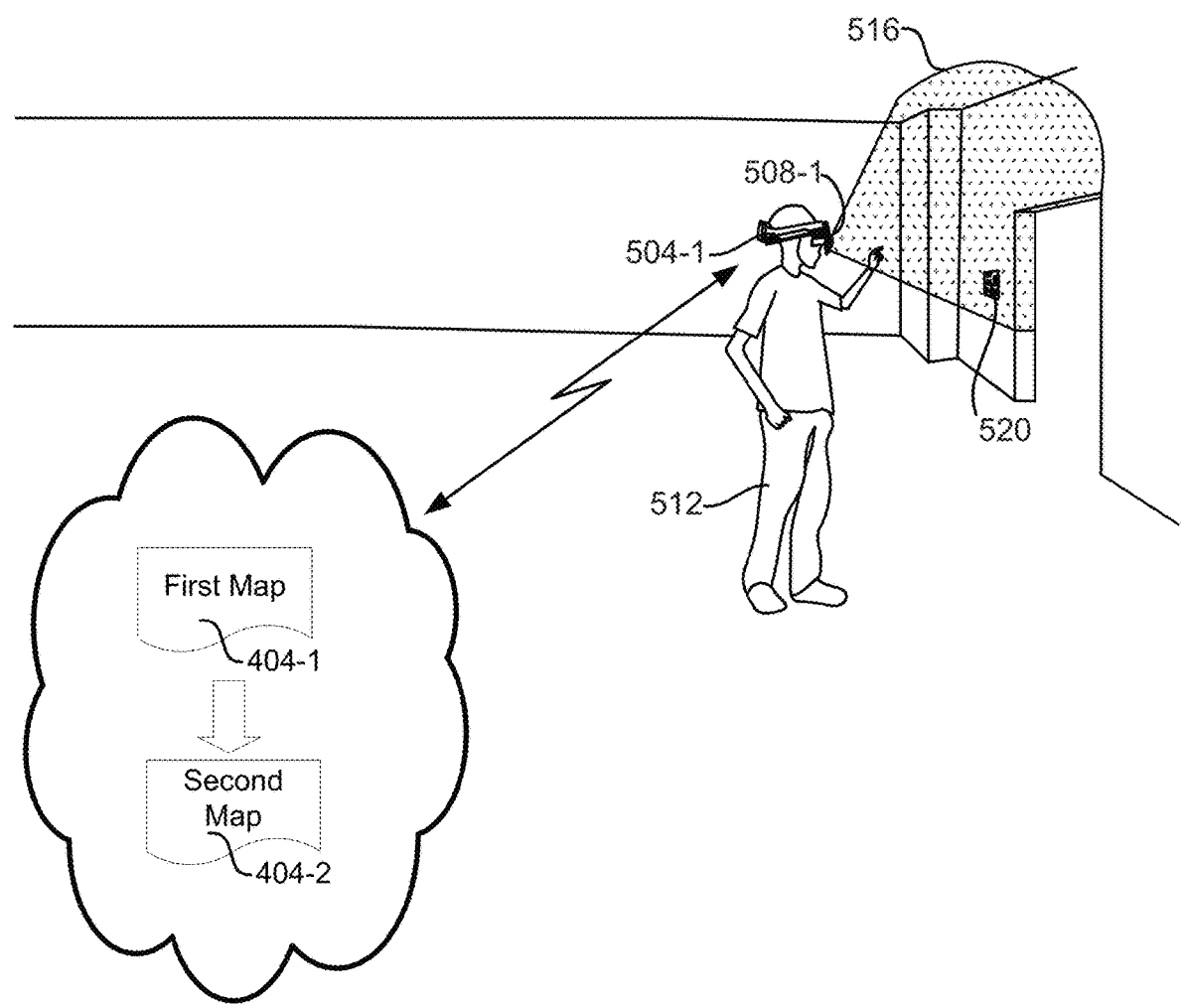
FIG. 5 depicts an embodiment of a first device using the central map to position itself and updating the central map.

FIG. 5 depicts an embodiment of a first device 504-1 using the central map to position itself and to update the central map. The first device 504-1 comprises a first optical sensor 508-1. FIG. 5 depicts a user 512 wearing the first device 504-1. In the embodiment shown, the first device 504-1 is a head-mounted, augmented-reality device (e.g., Trimble's XR10 with HoloLens 2). Other devices could be used. For example, the device 504 and/or the optical sensor 508 could be the source 108 from FIG. 1, FIG. 2, or FIG. 3. The device 504 and/or optical sensor 508 could be the new source 308 in FIG. 3. The first optical sensor 508-1 in FIG. 5 is a camera. The camera has a field of view 516.

The first map 404-1 is transmitted to the first device 504-1. The first map 404-1 can be the central map, a portion of the central map, or data from the central map (e.g., a fingerprint and/or position/orientation data of an AprilTag could be the first map 404-1 or part of the first map). The first device 504-1 orients itself to the environment (e.g., the construction site) using the first map 404-1 by comparing information from the first optical sensor 508-1 to the first map 404-1. For example, the first device acquires one or more images with the camera and matches features in the one or more images to features in the first map 404-1. This is an example of stage 2 of using a central map. In some embodiments, information from the first optical sensor 508-1 is a local map of the first device 504-1 (e.g., generated from images and/or inertial data from the AR headset).

Data acquired from the optical sensor 508 can be transmitted to a computer maintaining the central map. For example, image and/or location data of object 520 (a new object) is transmitted to the computer maintaining the central map. The object 520 in FIG. 5 is a two-dimensional barcode (e.g., an April tag). Thus, the central map system can receive optical data acquired by the optical sensor 508. This is an example of stage 3 of using the central map. As more devices 504 transmit data about the construction site, the central map is updated.

The first map 404-1 is updated, using the optical data from the first optical sensor 508-1, to generate a second map 404-2. For example, the central map is updated using images from a camera of the AR device and/or position data from the AR device, and the second map 404-2 comprises data based on the updated central map. In the embodiment shown, the first map 404-1 does not contain data about the object 520, whereas the second map 404-2 does, based on data of the object 520 acquired by the first device 504-1.

Figure 6:
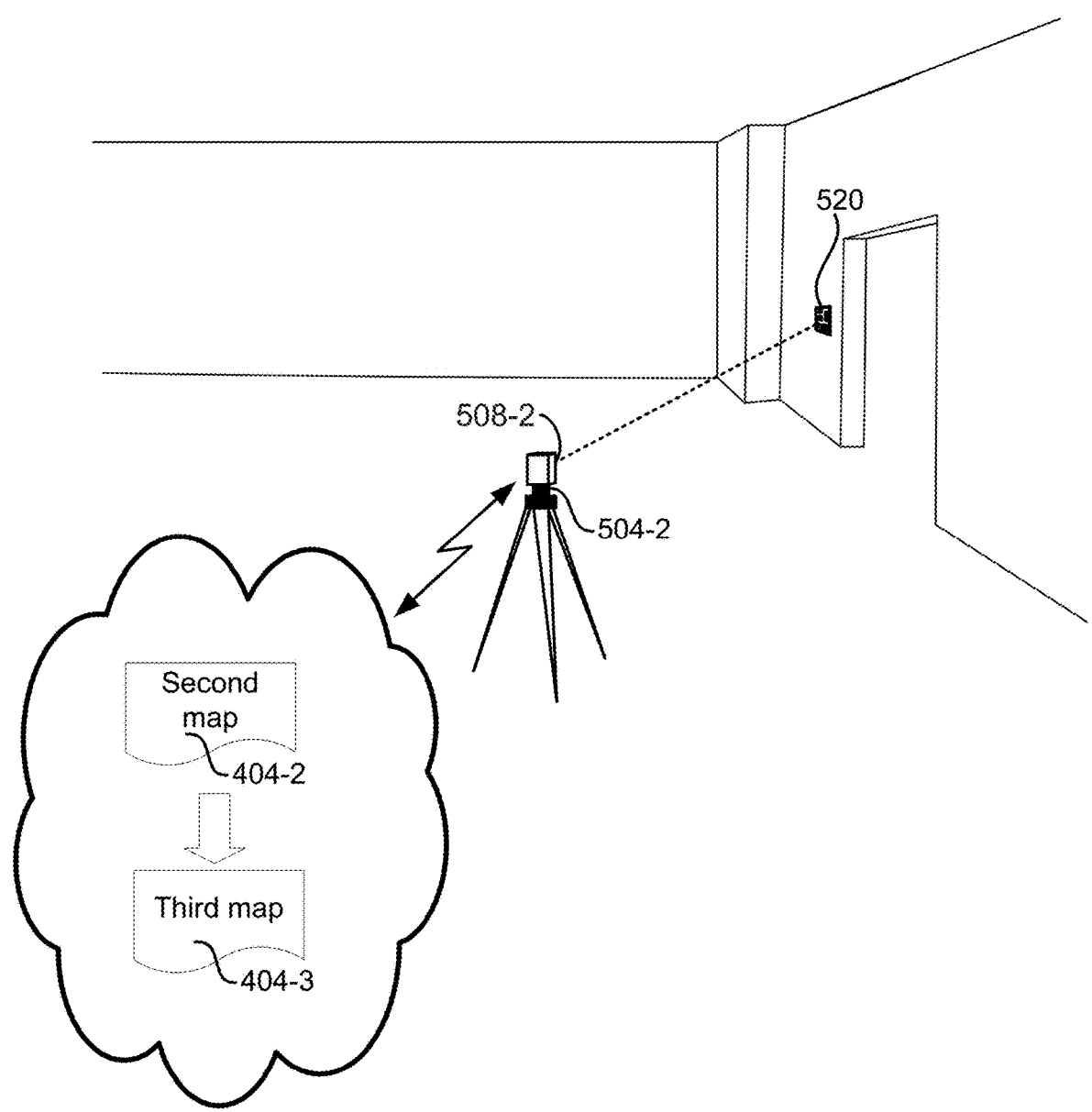
FIG. 6 depicts an embodiment of a second device updating the central map.

FIG. 6 depicts an embodiment of a second device 504-2 updating the central map. The second device 504-2 is different from the first device 504-1 in FIG. 5. The second device 504-2 comprises a second optical sensor 508-2. The second optical device 504-2, in the embodiment in FIG. 6, is a robotic total station, and the second optical device 508-2 is an EDM (electronic distance measurement) unit of the total station. In some embodiments, the second device 504-2 is a different type of device than a total station (e.g., an AR device, 360 camera, laser scanner, GNSS receiver).

The second map 404-2 can be transmitted to the second device 504-2, and/or the second device 504-2 can be oriented to the construction site based on comparing information from the second optical sensor 508-2 to the second map 404-2. For example, the EDM of the total station could measure distances and angles to corners in the environment and match measurements to features in the second map 404-2. In some embodiments, the total station (or other device, such as a GNSS device) is oriented to the environment using means other than images from the map 404.

The total station could aim (e.g., automatically) at the object 520, based on position data of the object 520 in the second map 404-2. The total station could then precisely measure the position the object 520. This embodiment could be used to precisely position control points within an environment. For example, an AR device could be used to tag targets (e.g., control points) and provide rough positions of the targets while the user places the targets in the environment. Then, a more precise measurement tool, such as a total station, could be used to precisely position the targets, using the rough positions to quickly and/or automatically aim at the targets to measure them.

Optical data from the second device 504-2, acquired by the second optical sensor 508-2 can be transmitted to the map system. The second map 404-2 can be revised to generate a third map 404-3, using the optical data from the second optical sensor 508-2. For example, the third map 404-3 contains an updated position (e.g., more accurate) of the object 520. The position data of the object 520 can be color coded (e.g., green) or flagged to indicate that the position of the object 520 is measured within a specific tolerance (e.g., within 2, 5, 10, 20, or 50 mm accuracy; for use in re-sectioning a device).

The map 404 can continue to be updated as more devices 504 are in the environment, and/or as previous devices return to the environment.

Figure 7:
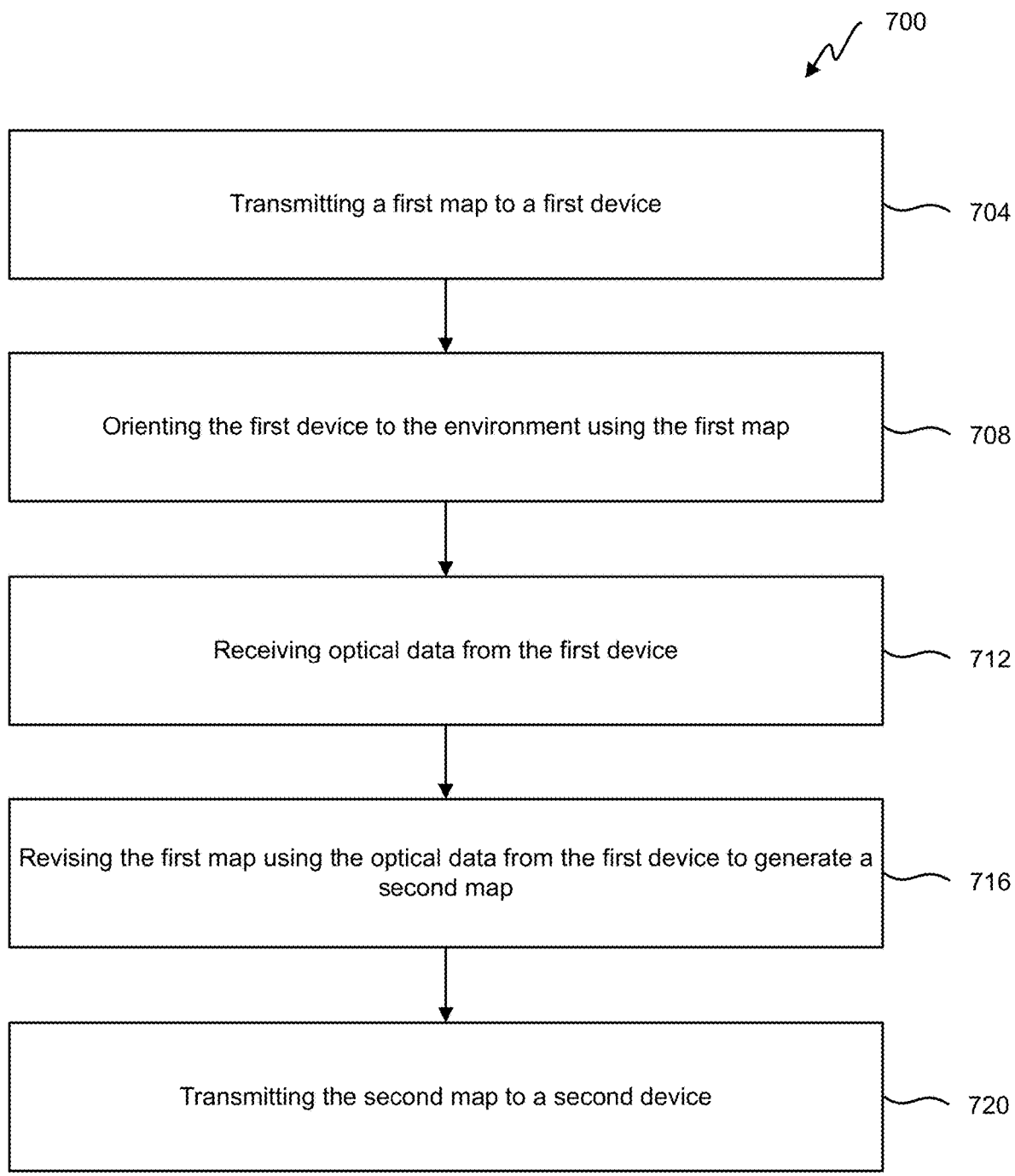
FIG. 7 illustrates a flowchart of an embodiment of a process for using an aggregated map at a construction site.

FIG. 7 illustrates a flowchart of an embodiment of a process 700 for using an aggregated map (e.g., a central map) in an environment (e.g., at a construction site). Process 700 begins in step 704 with transmitting a first map to a first device. The first device comprises a first optical sensor. For example, the first map 404-1 is transmitted to the first device 504-1 in FIG. 5.

In step 708, the first device is oriented to the construction site using the first map. For example, the first device 504-1 in FIG. 5 orients a local map (e.g., an map created by images from one or more cameras and/or inertial measurement units of the AR device) to the first map 404-1 based on correlating features in the local map to features in the first map 404-1.

In step 712, optical data acquired by the first device (e.g., from the first optical sensor) is received. For example, the first device 504-1 transmits data obtained from the first optical sensor 508-1 in FIG. 5 (e.g., image and/or position data of object 520) to a computer that updates the first map 404-1.

In step 716, the first map is updated (e.g., revised) using the optical data from the first optical sensor of the first device to generate a second map. For example, the first map 404-1 is updated to generate the second map 404-2 in FIG. 5.

In step 720, the second map is transmitted to a second device. The second device comprises a second optical sensor. For example, the second map 404-2 is transmitted to the second device 504-2 in FIG. 6. The second device can be oriented to the environment based on comparing information from the second optical sensor to the second map. For example, the second device is a second AR device and features in a local map of the second AR device are compared to features in the second map.

In some embodiments, the first map is based on data from a laser scanner (e.g., laser scanner 408 in FIG. 4); the first device and/or the second device is an augmented-reality device; information from the first optical sensor is a local map of the augmented-reality device; the environment is a restricted environment for receiving global navigation satellite system (GNSS) signals; the map is updated dynamically (e.g., receiving the optical data acquired by the second optical sensor occurs within 1, 3, 6, 8, 12, 24, 48, or 168 hours from receiving the optical data acquired by the first optical sensor); the first map includes labels of features in the construction site (e.g., control points, hazards, notes, type/size/location of fastener to be placed); and/or the second map includes color-coding to distinguish optical data acquired by the first device from data in the first map (e.g., the color object 520 from FIG. 5 is colored to show that it is new and/or the object 520 from FIG. 6 colored to show that the object 520 is measured with a certain level of accuracy).

In some embodiments, a process further comprises receiving optical data acquired by the second optical sensor (e.g., a computer updating the map 404 receives optical data from the second device 504-2 in FIG. 6); revising the second map using the optical data from the second optical sensor to generate a third map (e.g., adding to the second map 404-2 to generate the third map 404-3 in FIG. 6); orienting a third device (e.g., a second or third AR device) to the construction site based on the third map (e.g., orienting a second AR device based on the third map 404-3 in FIG. 6); and/or updating the second map based on data from a total station, a global navigation satellite system, a 360-degree camera, an electronic distance measuring (EDM) unit, and/or a radio-based sensor to generate a third map.

Figure 8:
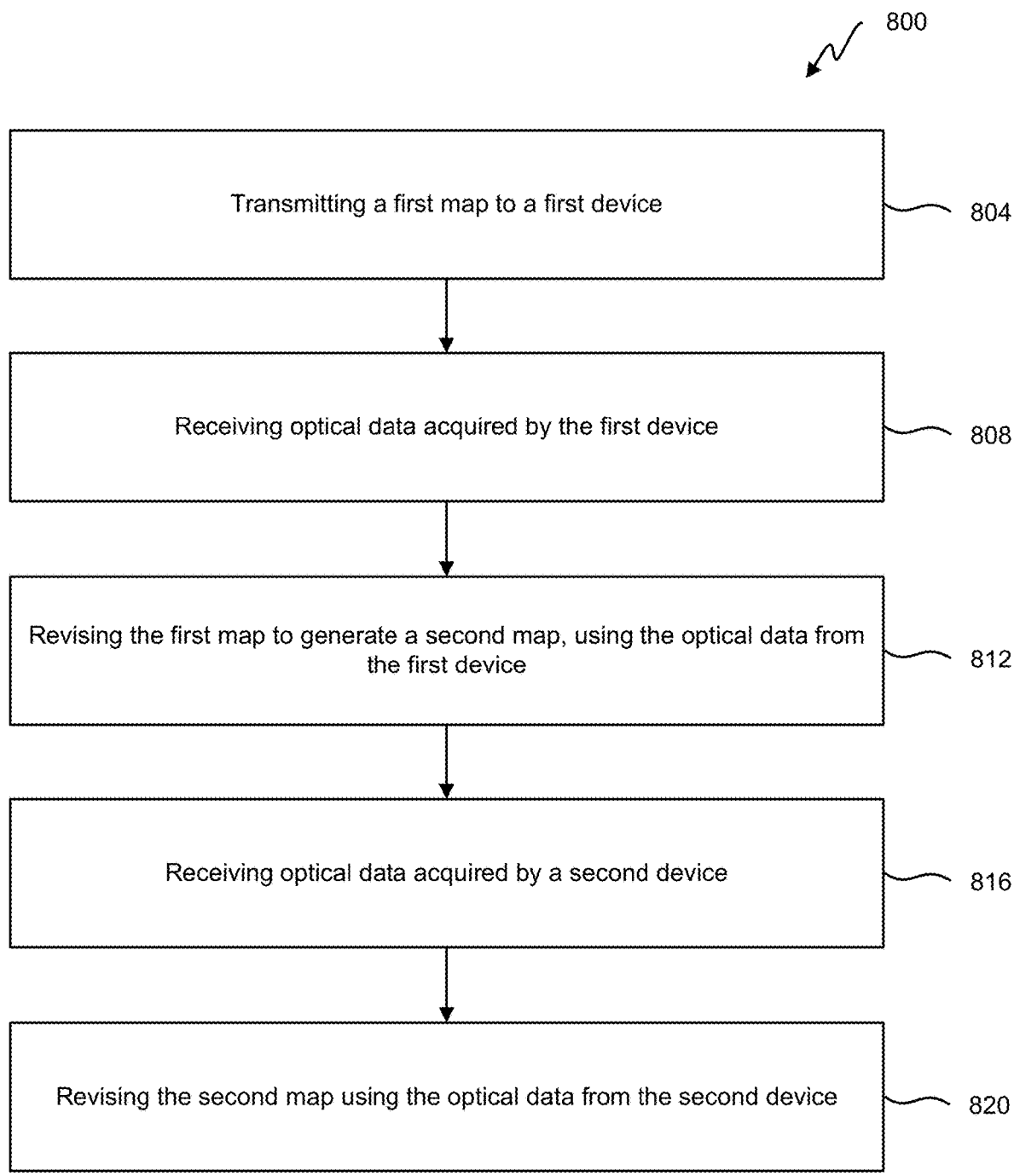
FIG. 8 illustrates a flowchart of an embodiment of a process for updating an aggregated map of an environment.

FIG. 8 illustrates a flowchart of an embodiment of a process 800 for updating an aggregated map of an environment. Process 800 begins in step 804 with transmitting a first map to a first device. The first device comprises a first optical sensor. For example, the first map 404-1 is transmitted to the first device 504-1 in FIG. 5. The first device is oriented to the environment based on comparing information from the first optical sensor to the first map. For example, the first device 504-1 in FIG. 5 orients a local map (e.g., created by images from one or more cameras and/or inertial measurement units of the AR device) to the first map 404-1 based on correlating features in the local map to features in the first map 404-1.

In step 808, optical data acquired by the first device (e.g., optical data acquired by the first optical sensor and/or by more sensors of the first device) is received. For example, the first device 504-1 transmits data obtained from the first optical sensor 508-1 in FIG. 5 (e.g., image and/or position data of object 520) to a computer that updates the first map 404-1. Optical data from the first device is received after transmitting the first map to the first device.

In step 812, the first map is revised to generate a second map, using optical data from the first device. For example, the first map 404-1 is updated to generate the second map 404-2 in FIG. 5. The second map includes the object 520 from FIG. 5. The second map could color code or otherwise flag the object 520 to indicate the object 520 is new to the central map.

In step 816, optical data acquired by a second optical sensor of a second device is received, after generating the second map. For example, position data of the object 520, having higher accuracy, is received from the robotic total station in FIG. 6.

In step 820 the second map is revised using the optical data from the second optical sensor to generate a third map. For example, the second map 404-2 is updated to generate the third map 404-3 based on data from the EDM of the total station in FIG. 6. The third map can include information about the updated data (e.g., the object 520 is color coded or otherwise flagged to indicate a more accurate position).

In some embodiments, the first map is based on data from a laser scanner; the first device is an augmented-reality device; and/or receiving the optical data acquired by the second optical sensor occurs within 72 or 96 hours from receiving the optical data acquired by the first optical sensor.

In some embodiments, a process further comprises updating the second revised map based on data from a laser scanner; GNSS signals; or a total station to generate a third revised map; transmitting the third map to a third device, wherein the third device comprises an optical sensor; orienting the third device to the environment based on the third map; transmitting the second map to the second device; orienting the second device to the environment based on comparing information from the second optical sensor to the second map; and/or orienting the first device based on the second map or the third map (e.g., the first device returns to the environment and receives the second map).

In some embodiments, a method for using an aggregated map (e.g., a central map) at a construction site comprises generating an initial map of at least a portion of the construction site based on data from a laser scanner; generating a first local map based on image data acquired by a first augmented-reality device; orienting the first local map to the initial map; updating the initial map based on data from the first local map, to generate a first revised map (e.g., the second map 404-2 in FIG. 5); generating a second local map based on image data acquired by a second augmented-reality device; orienting the second local map to the first revised map; receiving data from the second local map of the second augmented-reality device; and/or updating the first revised map based on data from the second local map to generate a second revised map.

Figure 9:
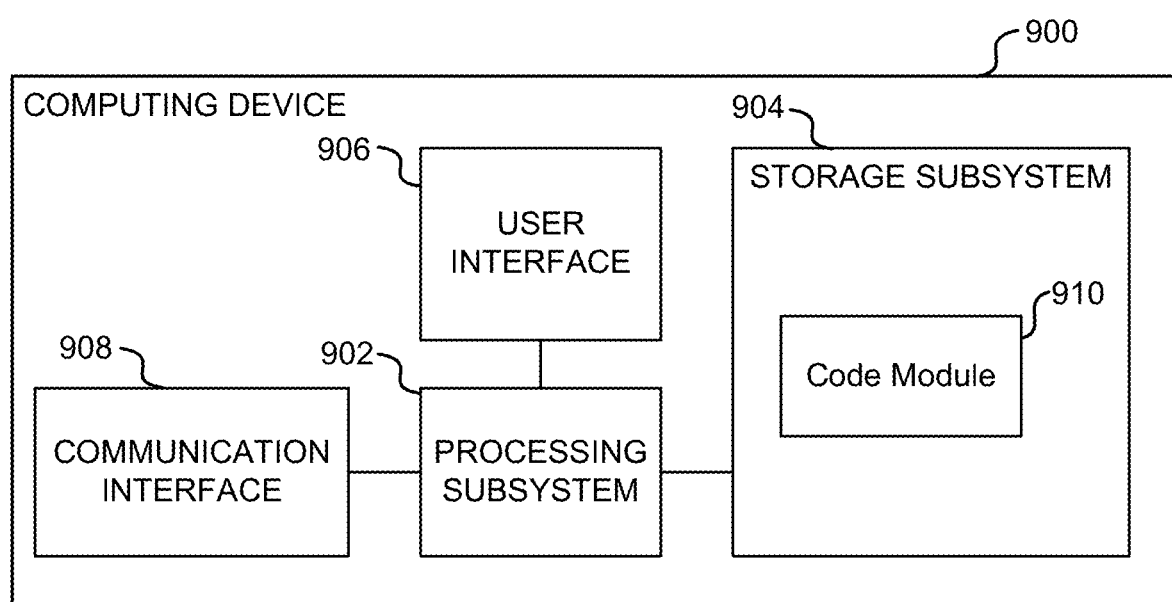
FIG. 9 depicts a block diagram of an embodiment of a computer system.

FIG. 9 is a simplified block diagram of a computing device 900. Computing device 900 can implement some or all functions, behaviors, and/or capabilities described above that would use electronic storage or processing, as well as other functions, behaviors, or capabilities not expressly described. Computing device 900 includes a processing subsystem 902, a storage subsystem 904, a user interface 906, and/or a communication interface 908. Computing device 900 can also include other components (not explicitly shown) such as a battery, power controllers, and other components operable to provide various enhanced capabilities. In various embodiments, computing device 900 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 904 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 904 can store one or more applications and/or operating system programs to be executed by processing subsystem 902, including programs to implement some or all operations described above that would be performed using a computer. For example, storage subsystem 904 can store one or more code modules 910 for implementing one or more method steps described above.

A firmware and/or software implementation may be implemented with modules (e.g., procedures, functions, and so on). A machine-readable medium tangibly embodying instructions may be used in implementing methodologies described herein. Code modules 910 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 910) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 910 may comprise sets of instructions (codes) embodied on a computer-readable medium that directs a processor of a computing device 900 to perform corresponding actions. The instructions may be configured to run in sequential order, in parallel (such as under different processing threads), or in a combination thereof. After loading a code module 910 on a general purpose computer system, the general purpose computer is transformed into a special purpose computer system.

Computer programs incorporating various features described herein (e.g., in one or more code modules 910) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 904 can also store information useful for establishing network connections using the communication interface 908.

User interface 906 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 906 to invoke the functionality of computing device 900 and can view and/or hear output from computing device 900 via output devices of user interface 906. For some embodiments, the user interface 906 might not be present (e.g., for a process using an ASIC).

Processing subsystem 902 can be implemented as one or more processors (e.g., integrated circuits, one or more single-core or multi-core microprocessors, microcontrollers, central processing unit, graphics processing unit, etc.). In operation, processing subsystem 902 can control the operation of computing device 900. In some embodiments, processing subsystem 902 can execute a variety of programs in response to program code and can maintain multiple concurrently executing programs or processes. At a given time, some or all of a program code to be executed can reside in processing subsystem 902 and/or in storage media, such as storage subsystem 904. Through programming, processing subsystem 902 can provide various functionality for computing device 900. Processing subsystem 902 can also execute other programs to control other functions of computing device 900, including programs that may be stored in storage subsystem 904.

Communication interface 908 can provide voice and/or data communication capability for computing device 900. In some embodiments, communication interface 908 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 908 can provide wired connectivity (e.g., universal serial bus, Ethernet, universal asynchronous receiver/transmitter, etc.) in addition to, or in lieu of, a wireless interface. Communication interface 908 can be implemented using a combination of hardware (e.g., driver circuits, antennas, modulators/demodulators, encoders/decoders, and other analog and/or digital signal processing circuits) and software components. In some embodiments, communication interface 908 can support multiple communication channels concurrently. In some embodiments, the communication interface 908 is not used.

It will be appreciated that computing device 900 is illustrative and that variations and modifications are possible. A computing device can have various functionality not specifically described (e.g., voice communication via cellular telephone networks) and can include components appropriate to such functionality.

Further, while the computing device 900 is described with reference to particular blocks, it is to be understood that these blocks are defined for convenience of description and are not intended to imply a particular physical arrangement of component parts. For example, the processing subsystem 902, the storage subsystem 904, the user interface 906, and/or the communication interface 908 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 900.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents. For example, a map could be generated and used entirely from one or more mobile devices (e.g., smartphones and/or tablets)

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A system for using maps at a construction site, the system comprising:
    a first device comprising a first optical sensor, wherein the first device is an augmented-reality device, wherein the augmented-reality device is a head-mounted display;
    a second device comprising a second optical sensor comprising an electronic distance measurement tool, wherein the second device is configured to measure a position of a target at the construction site using the electronic distance measurement tool;
    one or more memory devices comprising instructions that, when executed, cause one or more processors to:
    transmit a first map to the first device;
    orient the first device to the construction site based on comparing information from the first optical sensor to the first map;
    receive optical data acquired by the first optical sensor related to the position of the target;
    revise the first map using the optical data from the first optical sensor to generate a second map;
    transmit the second map to the second device; and
    orient the second device to the construction site based on comparing information from the second optical sensor to the second map;
    receive optical data acquired by the second optical sensor, including the position of the target measured using the electronic distance measurement tool;
    revise the second map using the optical data from the second optical sensor to generate a third map; and
    orient a third device to the construction site based on the third map.

2. The system of claim 1, wherein the information from the first optical sensor is a local map of the augmented-reality device.

3. The system of claim 1, wherein:
    the second device is a robot; and
    the instructions, when executed, further cause the one or more processors to automatically position the robot at the construction site based on orienting the second device to the construction site.

4. The system of claim 1, wherein the first map is based on data from a robotic total station.

5. The system of claim 1, wherein the second device comprises a robotic total station.

6. A method for using maps at a construction site, the method comprising:
    receiving a first map of at least a portion of the construction site;
    transmitting the first map to a first device, wherein the first device comprises a first optical sensor, wherein the first device is an augmented-reality device, and wherein the augmented-reality device is a head-mounted display;
    orienting the first device to the construction site based on comparing information from the first optical sensor to the first map;
    receiving optical data acquired by the first optical sensor;
    revising the first map using the optical data from the first optical sensor to generate a second map;
    transmitting the second map to a second device, wherein the second device comprises a second optical sensor that comprises an electronic distance measurement tool,
    orienting the second device to the construction site based on comparing information from the second optical sensor to the second map;
    measuring a position of a target at the construction site using the electronic distance measurement tool;
    receiving optical data acquired by the second optical sensor, including the position of the target measured using the electronic distance measurement tool;
    revising the second map using the optical data from the second optical sensor to generate a third map; and
    orienting a third device to the construction site based on the third map.

7. The method of claim 6, wherein the first map is based on data from a laser scanner.

8. The method of claim 6, wherein information from the first optical sensor is a local map of the augmented-reality device.

9. The method of claim 6, wherein receiving the optical data acquired by the second optical sensor occurs within 24 hours from receiving the optical data acquired by the first optical sensor.

10. The method of claim 6, wherein the construction site is an environment for receiving global navigation satellite system signals.

11. The method of claim 6, further comprising updating the second map based on data from a total station.

12. The method of claim 6, wherein the first map includes labels of features in the construction site.

13. The method of claim 6, wherein the second map includes color-coding to distinguish optical data acquired by the first device from data in the first map.

14. A method for updating maps of an environment, the method comprising:
    transmitting a first map to a first device, wherein the first device comprises a first optical sensor, wherein the first device is an augmented-reality device, and wherein the augmented-reality device is a head-mounted display;
    orienting the first device to the environment based on comparing information from the first optical sensor to the first map;
    receiving optical data acquired by the first optical sensor, after transmitting the first map to the first device;
    revising the first map using the optical data from the first optical sensor to generate a second map;
    receiving optical data acquired by a second optical sensor of a second device, after generating the second map, wherein the second device comprises an electronic distance measurement tool;
    measuring a position of a target in the environment using the electronic distance measurement tool;
    revising the second map using the optical data from the second optical sensor, including the position of the target measured used the electronic distance measurement tool, to generate a third map; and
    orienting a third device to a construction site based on the third map.

15. The method of claim 14, wherein:
the first map is based on data from a laser scanner.

16. The method of claim 14, wherein receiving the optical data acquired by the second optical sensor occurs within 72 hours from receiving the optical data acquired by the first optical sensor.

17. The method of claim 14, further comprising transmitting the third map to the third device, wherein the third device comprises an optical sensor.

18. The method of claim 14, further comprising:
- transmitting the second map to the second device; and
- orienting the second device to the environment based on comparing information from the second optical sensor to the second map.

\* \* \* \* \*